United States Patent
Kurth et al.

(10) Patent No.: US 10,196,585 B2
(45) Date of Patent: Feb. 5, 2019

(54) BLOWN AND STRIPPED BIORENEWABLE OILS

(71) Applicant: Cargill, Incorporated, Wayzata, MN (US)

(72) Inventors: Todd L. Kurth, Maple Grove, MN (US); Frank P. Lochel, Delano, MN (US); Suzanne Stauduhar, Robbinsdale, MN (US); Hassan Ali Tabatabaee, Plymouth, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 15/670,385

(22) Filed: Aug. 7, 2017

(65) Prior Publication Data
US 2017/0335233 A1 Nov. 23, 2017

Related U.S. Application Data

(62) Division of application No. 15/120,942, filed as application No. PCT/US2015/020536 on Mar. 13, 2015, now Pat. No. 9,765,280.

(60) Provisional application No. 61/953,061, filed on Mar. 14, 2014.

(51) Int. Cl.
*C11B 3/08* (2006.01)
*C11C 3/00* (2006.01)

(52) U.S. Cl.
CPC ............. *C11B 3/08* (2013.01); *C11C 3/006* (2013.01)

(58) Field of Classification Search
CPC ................................. C11B 3/08; C11C 3/006
USPC ........................................................... 554/134
See application file for complete search history.

(56) References Cited

U.S. PATENT DOCUMENTS

| 2,750,298 A | 6/1956 | Kiebler, Jr. et al. |
| 2012/0065417 A1 * | 3/2012 | Hora ........................ C11B 3/14 554/124 |

* cited by examiner

*Primary Examiner* — Deborah D Carr

(57) ABSTRACT

A method for producing a blown and stripped biorenewable oil is provided. The method may include the steps of (a) heating a biorenewable oil to at least 90° C.; (b) exposing an oxygen containing stream to the heated oil to produce a blown oil having a viscosity of at least 40 cSt at 40° C.; (c) adding a base metal catalyst to the blown oil; and (d) stripping the blown oil from step (c) until the stripped oil has an acid value of from about 1 mg KOH/g to about 20 mg KOH/g; wherein the stripped oil from step (d) has a flash point of at least 220° C.

18 Claims, No Drawings

BLOWN AND STRIPPED BIORENEWABLE OILS

CROSS-REFERENCE TO RELATED APPLICATIONS

This application is a Divisional of U.S. patent application Ser. No. 15/120,942, filed Aug. 23, 2016, entitled "BLOWN AND STRIPPED BIORENEWABLE OILS", which is a national phase entry of International Application No. PCT/US15/020536, filed Mar. 13, 2015, entitled "BLOWN AND STRIPPED BIORENEWABLE OILS", which claims priority to U.S. Patent Application, Ser. No. 61/953,061, filed Mar. 14, 2014, entitled "BLOWN AND STRIPPED PLANT-BASED OILS", which are hereby incorporated by reference in their entirety.

TECHNICAL FIELD

This disclosure relates to blown and stripped biorenewable oils and methods for making such oils.

BACKGROUND

Recent technical challenges facing the asphalt industry have created opportunities for the introduction of agriculture-based products for the overall performance enhancement of asphalt.

The predominant use of asphalt is in road pavement, which is generally made up of 95% aggregate and 5% asphalt binder. Asphalt binder is typically made up of >95% bitumen and <5% additives that enhance performance. Crude asphalt (bitumen) is primarily derived from the bottoms of petroleum refining, which is approximately 3% of the barrel of crude oil, depending on the grade of the crude oil. However, petroleum companies are improving refining efficiency to meet increasing demands for transportation fuels, which negatively impacts the quality and quantity of bitumen available for asphalt production. With cold temperatures, asphalt becomes brittle, resulting in cracking and water penetration, leading to freeze-thaw damage. With high temperatures, asphalt becomes softer, resulting in rutting with heavy traffic. In short, higher refining efficiency is leading to asphalt which is significantly more brittle. Accordingly, asphalt modifiers are being incorporated into asphalt to modify its performance properties in variable weather conditions.

SUMMARY

One embodiment provides a method for producing a blown and stripped biorenewable oil. The method comprises the steps of (a) heating a biorenewable oil to at least 90° C., (b) exposing an oxygen containing stream to the heated oil to produce a blown oil having a viscosity of at least 40 cSt at 40° C., (c) adding a base metal catalyst to the blown oil; and (d) stripping the blown oil from step (c) until the stripped oil has an acid value of from about 1 mg KOH/g to about 20 mg KOH/g. In this embodiment, the stripped oil from step (d) has a flash point of at least 220° C.

Another embodiment provides a method for producing a blown and stripped biorenewable oil. The method comprises the steps of (a) heating a composition comprising biorenewable oil and a first catalyst to at least 90° C., (b) exposing an oxygen containing stream to the heated composition from step (a) to produce a blown oil having a viscosity of at least 40 cSt at 40° C., (c) adding a second catalyst to the blown oil from step (b), and (d) stripping the blown oil from step (c) to produce a stripped oil having an acid value of from about 1 mg KOH/g to about 20 mg KOH/g. In this embodiment, the first catalyst and the second catalyst are different.

Another embodiment provides a method for producing a blown and stripped biorenewable oil. The method comprises the steps of heating a biorenewable oil to at least 90° C., exposing an oxygen containing stream to the heated oil to produce a blown oil having a hydroxyl value of 10 to 70, and stripping the blown oil from step (b) to produce a stripped oil having an acid value of from about 1 mg KOH/g to about 20 mg KOH/g.

Another embodiment provides a method for producing a blown biorenewable oil. The method comprises the steps of heating the oil to at least 90° C. and exposing an oxygen containing stream to the heated oil to produce a blown oil having a viscosity of about 40 cSt to about 50 cSt at 40° C. The blown oil in this embodiment has a flash point of at least 220° C.

DETAILED DESCRIPTION

"Acid Value" (AV) is a measure of the residual hydronium groups present in a compound and is reported in units of mg KOH/gram material. The acid number is measured according to the method of AOCS Cd 3d-63.

"Flash Point" or "Flash Point Temperature" is a measure of the minimum temperature at which a material will initially flash with a brief flame. It is measured according to the method of ASTM D-92 using a Cleveland Open Cup and is reported in degrees Celsius (° C.).

"Gardner Color Value" is a visual measure of the color of a material. It is determined according to the procedure of ASTM D1544, "Standard Test Method for Color of Transparent Liquids (Gardner Color Scale)". The Gardner Color scale ranges from colors of water-white to dark brown defined by a series of standards ranging from colorless to dark brown, against which the sample of interest is compared. Values range from 0 for the lightest to 18 for the darkest. For the purposes of the invention, the Gardner Color Value is measured on a sample of material at a temperature of 25° C.

"Iodine Value" (IV) is defined as the number of grams of iodine that will react with 100 grams of material being measured. Iodine value is a measure of the unsaturation (carbon-carbon double bonds and carbon-carbon triple bonds) present in a material. Iodine Value is reported in units of grams iodine ($I_2$) per 100 grams material and is determined using the procedure of AOCS Cd 1d-92.

"Hydroxyl Value" is a measure of the hydroxyl (—OH) groups present in a material. It is determined using the procedure of AOCS Cd 13-60.

"Performance Grade" (PG) is defined as the temperature interval for which a specific asphalt product is designed. For example, an asphalt product designed to accommodate a high temperature of 64° C. and a low temperature of −22° C. has a PG of 64-22.

"Pour Point" or "Pour Point Temperature" is a measure of the lowest temperature at which a fluid will flow. It is measured according to the method of ASTM D-97 and is reported in degrees Celsius (° C.).

"Useful Temperature Interval" (UTI) is defined as the interval between the highest temperature and lowest temperature for which a specific asphalt product is designed. For example, an asphalt product designed to accommodate a high temperature of 64° C. and a low temperature of −22° C. has a UTI of 86. For road paving applications, the seasonal and geographic extremes of temperature will determine the UTI for which an asphalt product must be designed.

Also, for the purpose of this invention, asphalt, asphalt binder, and bitumen refer to the binder phase of an asphalt pavement. Bituminous material may refer to a blend of asphalt binder and other material such as aggregate or filler. The binder used in this invention may be material acquired from asphalt producing refineries, flux, refinery vacuum tower bottoms, pitch, and other residues of processing of vacuum tower bottoms, as well as oxidized and aged asphalt from recycled bituminous material such as reclaimed asphalt pavement (RAP), and recycled asphalt shingles (RAS).

Biorenewable Oils

Biorenewable oils are used as the starting oil material. Biorenewable oils can be include oils isolated from plants, animals, and microorganisms including algae.

Plant-based oils are oils recovered from plants and algae. Plant-based oils that can be utilized in the invention include, soybean oil, linseed oil, canola oil, rapeseed oil, cottonseed oil, sunflower oil, palm oil, peanut oil, safflower oil, corn oil, corn stillage oil, lecithin (phospholipids) and combinations and crude streams thereof or co-products, by-products, or residues resulting from oil refining processes.

Examples of animal-based oils may include but are not limited to animal fat (e.g., lard, tallow) and lecithin (phospholipids), and combinations and crude streams thereof.

Biorenewable oils can also include partially hydrogenated oils, oils with conjugated bonds, and bodied oils wherein a heteroatom is not introduced, including diacylglycerides, monoacylglycerides, free fatty acids, and alkyl esters of fatty acids (e.g., methyl, ethyl, propyl, and butyl esters).

Biorenewable oils can also include derivatives thereof, for example, previously modified or functionalized oils (intentional or unintentional) wherein a heteroatom (oxygen, nitrogen, sulfur, and phosphorus) has been introduced may also be used as the starting oil material. Examples of unintentionally modified oils are used cooking oil, trap grease, brown grease, or other used industrial oils. Examples of previously modified oils are those that have been previously vulcanized or polymerized by other polymerizing technologies, such as maleic anhydride or acrylic acid modified, hydrogenated, dicyclopentadiene modified, conjugated via reaction with iodine, interesterified, or processed to modify acid value, hydroxyl number, or other properties. Such modified oils can be blended with unmodified plant-based oils or animal-based oils, fatty acids, glycerin, and/or gums materials.

Due to its relatively low polyunsaturation levels, relatively high mono- and di-unsaturation levels and other properties as further described below, the preferred plant oil utilized for the invention is corn stillage oil (also known as recovered corn oil), or alternatively a blend of corn stillage oil with other oils, such as soybean or palm oil. The preferred oil to blend with corn stillage oil is soybean oil because of soybean oil's relatively higher level of polyunsaturates compared to corn stillage oil. If higher functionality is desired, biorenewableoils having higher levels of unsaturation can be used. Conversely higher saturates may be incorporated to further vary solvent parameters of the polymerized oils to improve performance properties in asphalt.

Corn-Stillage Oil

The inventors have surprisingly discovered that the monoglycerides, diglycerides, triglycerides, free fatty acids, and glycerol (hereinafter collectively referred to as "corn stillage oil" which may also be referred to as "recovered corn oil") can be recovered from the other residual liquids resulting from the distillation of dry-grind corn fermented mash by suitable means, preferably by centrifugation of the residual material remaining after the ethanol has been distilled off. Centrifugation typically recovers twenty five percent of the corn stillage oil originally present in the residual material being centrifuged.

The corn stillage oil recovered by centrifugation typically: has an acid value from 16 to 32 mg KOH/gram, preferably from 18 to 30 mg KOH/gram; has an iodine value from 110 to 120 g 12/100 g sample; and contains from 0.05 to 0.29 percent by weight monoglycerides, from 1.65-7.08 percent by weight diglycerides, from 70.00 to 86.84 percent by weight triglycerides, from 8 to 16 percent by weight (for example, from 9 to 15 percent by weight) free fatty acids, and from 0.00 to 0.20 weight percent glycerin. Typically, the corn stillage oil has from 53 to 55 percent by weight groups derived from diunsaturated fatty acids, from 39 to 43 percent by weight groups derived from monounsaturated fatty acids, from 15 to 18 percent by weight groups derived from saturated fatty acids, and from 1 to 2 percent by weight groups derived from triunsaturated fatty acids. The groups derived from each of the above fatty acids are present either as groups within the mono-, di-, and tri-glycerides or as free fatty acids.

The free fatty acid content of the corn stillage oil most commonly is from about 11 to 12 percent (an acid value of from about 22 to 24 mg KOH/gram) is very high compared to conventional vegetable oils, but as mentioned above, the free fatty acid content can be higher or lower depending on processing procedure.

Recovery of Corn Stillage Oil

Fermented mash comprising ethanol, water, residual grain solids (including proteins, fats, and unfermented sugars and carbohydrates), and from 1 to 3 percent by weight corn stillage oil is heated to distill and recover ethanol from the fermented mash.

After the ethanol is distilled off, the remaining liquid portion typically contains from 1 wt % to 4 wt % corn stillage oil. The material remaining after the ethanol is distilled off is typically centrifuged using a centrifuge, such as a Westfalia sliding disk centrifuge available from Westfalia Corporation. From 25 wt % to 35 wt % of the corn stillage oil contained in the material is recovered during this centrifugation step. The recovered unprocessed corn stillage oil typically exhibits a Gardner color of 12 or greater, for example, a Gardner color of from 14 to 18.

Unprocessed corn stillage oil typically exhibits: a viscosity at 40° C. of from 25 to 35 cSt (for example from 28 to 31 cSt) as measured utilizing viscosity tubes in a constant temperature bath as further described below; a viscosity at 100° C. of from 5 to 10 cSt for example from 6 to 9 cSt as measured utilizing viscosity tubes in a constant temperature bath as further described below; a Viscosity Index of from 80 to 236 determined using the procedures and measurement scale established by the Society of Automotive Engineers; a flash point from 220° C. to 245° C., for example from 225° C. to 240° C.; a saponification value of from 170 to 206 mg KOH/g; a pour point typically of from −5° C. to −14° C.; an acid value of from 15 to 33 mg KOH/gram (for example, from 16 to 32 mg KOH/gram); an iodine value from 110 to 125 grams $I_2$/100 grams sample; and from 8 to 16 wt % (for example, from 9 to 15 wt %) free fatty acids.

Viscosity for this invention is measured according to the method of ASTM D445. In this method oil to be tested is placed in a calibrated glass capillary viscometer, which is then placed into a constant temperature bath at the temperature specified. Once thermal equilibrium is reached, the oil is drawn up into the reservoir of the capillary tube. As the fluid drains, it passes the top mark on the tube and a timer is started. When the oil passes the lower mark, the timer is stopped and the flow time is recorded. The recorded flow time is multiplied by a factor which is specific to each viscometer tube. The resultant product of the flow time multiplied by the factor is reported as viscosity in cSt at the test temperature.

Unprocessed corn stillage oil also typically contains two phases at 25° C. The first phase is the liquid phase, which settles toward the top of any container that contains the corn stillage oil. This phase typically is reddish in color. The second phase is a solid that typically settles toward the bottom of any container containing the oil. At 62° C., the second phase tends to dissolve into the liquid phase, but will settle out again if the untreated corn stillage oil is cooled to room temperature. The inventors have determined that the second solid phase typically makes up at least 4 percent by weight (4 wt %) of the total unprocessed corn stillage oil. For example, the second solid phase may make up from 5 wt % to 12 wt % of the unprocessed corn stillage oil. For purposes of this invention, this second solid phase is referred to as the "titre."

Heating the Oil

The biorenewable oil is heated to at least about 90° C., and preferably from about 100° C. to about 115° C. It shall be understood that this heating temperature may increase, for example to 160° C. or greater, to achieve faster polymerization. As described above, the biorenewable oil may include, for example, soybean oil, linseed oil, canola oil, rapeseed oil, cottonseed oil, sunflower oil, palm oil, peanut oil, safflower oil, corn oil, corn stillage oil, or combinations thereof. In a preferred embodiment, however, the biorenewable oil is corn stillage oil, soybean oil, or combinations thereof.

In some aspects, the biorenewable oil comprises from about 10% to about 15% by weight free fatty acids, from about 12% to about 20% by weight diacylglycerides, and from about 65% to about 78% by weight triglycerides.

Additives, initiators, catalysts, or combinations thereof, may be added to the biorenewable oil. Additives such as lecithin and/or additional fatty acids may be added to the biorenewable oil before or during the heating step. The use of additives may aid in reduction of costs associated with the biorenewable oil while at the same time providing additional benefit of surfactancy and thus superior application performance, specifically benefitting emulsifiability, anti-strip, and warm mix lubricity. Initiators such as peroxide or lung oil may be added to the biorenewable oil before or during the heating step.

A base metal catalyst also may be added to the biorenewable oil before or during the heating step to aid in the subsequent blowing step. If a base metal catalyst is used, it comprises a transition metal, and the transition metal is selected from the group consisting of cobalt, iron, zirconium, lead, and combinations thereof. The base metal catalyst may be added in amounts ranging from 200-1000 ppm.

In another aspect, accelerators may also be added to the biorenewable oil. For example, oxidizing chemicals, such as persulfates and permanganates, may be added to the biorenewable oil. In the presence of oxygen (from the oxygen containing stream, described below), these oxidizers (which promote oxidation) accelerate oxidative polymerization.

Blowing the Oil

Blowing is typically achieved by passing or exposing an oxygen containing stream through or to, respectively, the heated biorenewable oil or a composition comprising the biorenewable oil and other components (e.g., additives, initiators, catalysts). It shall be understood however that other processes that enable oxidation may be used as well to achieve a similar result as the blowing process. The vessel containing the biorenewable oil during the blowing step typically operates at atmospheric pressure. The pressure of the oxygen containing stream being blown through the oil is generally high enough to achieve the desired air flow through the biorenewable oil. The oxygen containing stream is introduced at a sufficient flow rate for a sufficient period of time to achieve the desired viscosity. Typically, the oxygen containing stream is introduced into the biorenewable oil at a rate of from about 40 to 450 cubic feet per minute. Preferably, the oxygen containing stream is dispersed evenly in the vessel to maximize surface area exposure. Typically, the vessel will have a distribution ring or spoke-like header to create small volume bubbles evenly within the oil. The duration of blowing the oxygen containing stream through the oil is varied and determined according to the desired properties of the blown oil and the end-use application for the resulting product.

In one aspect, the oxygen containing stream is an oxygen enriched stream derived from air. In another aspect, the oxygen containing stream comprises air. In yet another aspect, the oxygen containing stream comprises hydrogen peroxide.

The oxygen containing stream is blown through the biorenewable oil to provide a blown oil which has a viscosity of at least about 40 cSt at 40° C. to about 70 cSt at 40° C., and more preferably a viscosity ranging from about 40 cSt at 40° C. to about 60 cSt at 40° C., and even more preferably a viscosity ranging from about 40 cSt at 40° C. to about 55 cSt at 40° C. It shall be understood that for some biorenewable materials may be in solid form at 40° C., accordingly the viscosity measurement may need to be measured at higher temperatures.

The blown oil produced may comprise from about 10% to about 15% by weight free fatty acids, from about 12% to about 20% by weight diacylglycerides, from about 50% to about 70% by weight triglycerides, and from about 5% to about 20% by weight dimers (wherein dimers are defined as compounds having a molecular weight ranging from about 1500-2000 g/mol) and trimers (wherein trimers are defined as having a molecular weight ranging from about 2300-3000 g/mol), collectively.

The reactions that occur during the blowing of the oil increase the molecular weight of the oil, which tends to increase the viscosity of the blown oil versus the unblown oil. Additionally, the blowing process introduces hydroxyl and peroxide functionality into the resulting oil, which also tends to increase the viscosity of the oil.

In certain aspects where there is little to no concern for a desired acid value or flash point, the method can stop after blowing without proceeding to the stripping step. In this case, a primary focus of the blowing is to carry out etherification.

Stripping the Oil

The blown biorenewable oil can be stripped using a nitrogen sparge and, optionally, under vacuum conditions.

Before the blown biorenewable oil is stripped, however, a base metal catalyst may be added to the blown biorenewable oil to enhance the stripping step. In preferred aspects, the base metal catalyst is added in an amount ranging from 250-1200 ppm, and more preferably ranging from 900-1100 ppm. The amount of catalyst is controlled in such a way to provide the optimum level of fatty soaps in the final product.

In one aspect, the base metal catalyst comprises metal selected from the group consisting of monovalent metals, divalent metals, and combinations thereof as described in the IUPAC Periodic Table of Elements (2013). In other aspects, the base metal catalyst comprises metals selected from the group consisting of potassium, calcium, sodium, magnesium and mixtures thereof. In preferred aspects, the base metal catalyst is potassium hydroxide. The catalyst added to the blown biorenewable oil before the stripping step is not the same as the optional catalyst added to the biorenewable oil before the blowing step.

Typically, the temperature during the stripping step ranges from about 230° C. to about 350° C., and in some aspects from 230° C. to about 270° C., and in other aspects from about 235° C. to about 245° C. The stripping step typically increases molecular weight and therefore raises the viscosity of the oil. The stripping will also lower the content of free fatty acids in the oil and remove other volatiles from the oil, therefore reducing the acid value of the resulting stripped oil.

During the initial stages of the stripping step, bodying reactions may also take place. Notably, after a biorenewable oil is blown, it may carry with it dissolved oxygen and residual peroxides. These peroxides continue to react via oxidative polymerization as the fluid is heated until the existing supply of peroxide is consumed or decomposed by the elevated temperature. A nitrogen sparge is preferably introduced with a sparge rate high enough to assist in the removal of the volatiles. In some aspects, a vacuum can be used during the stripping step. The sparge rate is maintained on the oil to assist in the removal of volatiles from the oil, including water that may be liberated by the reaction of glycerin with fatty acids (when polyols are added to the stripping step, which is further described below). Once the acid value has been reduced to the desired value, the heat may be removed if the desired viscosity has been obtained. If the desired viscosity has not been reached, the oil can continue to be heated until the desired value for viscosity is obtained. After the desired acid value and viscosity have been obtained, the blown, stripped biorenewable oil may cool.

In preferred aspects, the blown oil is stripped until the acid value of the oil is reduced to from 1 mg KOH/gram to about 20 mg KOH/gram, preferably from about 2 mg KOH/gram to about 15 mg KOH/gram, and more preferably from about 3 mg KOH/gram to about 9 mg KOH/gram. Further, the blown oil is stripped until the hydroxyl value of the stripped biorenewable oil ranges from about 10 to about 70.

The inventors have surprisingly discovered that when it is necessary to reduce the acid value to particularly low levels (for example to values of 3.5 mg KOH/gram or less), it may be preferable to optionally add small amounts of a polyol (1.0-1.3% by weight of polyol—equivalent to 2.5-3 mole ratio free fatty acid to 1 mole ratio polyol), preferably glycerol, to the blown oil before, during, or after the stripping step.

Stripping the oil increases the viscosity of the resulting oil compared to the non-stripped oil and will increase the flash point of the resulting oil. Thus, in some aspects, the viscosity of the stripped oil ranges from about 45 eSt to about 70 eSt at 40° C. Further, in some aspects, the flash point of the resulting oil is at least 220° C., more preferably at least 230° C., even more preferably at least 240° C., and even more preferably at least 246° C. In other aspects, the flash point of the resulting oil ranges from about 225° C. to about 245° C.

Further, in aspects of the present invention, the stripped biorenewable oil comprises from about 2% to about 10% by weight free fatty acids, from about 12% to about 22% by weight diacylglycerides, from about 50% to about 70% by weight triglycerides, and from about 5% to about 20% by weight dimers (wherein dimers are defined as compounds having a molecular weight ranging from about 1500-2000 g/mol) and trimers (wherein trimers are defined as having a molecular weight ranging from about 2300-3000 g/mol), collectively (it shall be understood that a small amount of tetramers may also be included in that 5% to 20% range).

Polyol

As discussed above, the inventors have surprisingly discovered that by adding a polyol to the blown oil the blown oil may be more easily stripped to obtain a blown, stripped biorenewable oil having a high viscosity and a low acid value as described above, which will result in a blown, stripped biorenewable oil having a high flash point and superior asphalt performance (e.g., reducing short term age hardening and volatile mass loss leading to enhanced UTI improvement, mitigation of deleterious interactions with asphalt additives, etc.).

The added polyol preferably has a molecular weight of at least 80 Daltons, more preferably at least 85 Daltons, and more preferably at least 90 Daltons. In order to aid in the reaction of the polyol with the free fatty acids, the polyol preferably has at least two hydroxyl groups per molecule, and more preferably at least 3 hydroxyl groups per molecule. The polyol preferably has a boiling point of at least 250° C., more preferably at least 270° C., and further more preferably at least 285° C. Any reference to boiling point herein means the boiling point at a pressure of 760 mm Hg. Due to its relatively high molecular weight (92 Daltons), relatively high boiling point (290° C.), high number of hydroxyl groups per molecule (3), and ready commercial availability, glycerin is the preferred polyol to utilize in the invention.

Examples of other polyols that may be utilized include, but are not limited to, trimethylol propane ("TMP"), polyethylene glycol ("PEG"), pentaerythritol, and polyglycerol.

In certain preferred aspects of the invention, the polyol (e.g. glycerol) contains less than 500 ppm chloride ions. In certain aspects, the polyol contains less than 300 ppm, less than 200 ppm, less than 100 ppm, less than 70 ppm, or less than 50 ppm chloride ions. Reduced chloride ion concentrations may minimize corrosion concerns in products that are manufactured utilizing a blown, stripped biorenewable oil of the present invention. In one particularly preferred aspect, the polyol comprises technical grade or USP glycerol, typically having less than 30 ppm chloride ions and preferably less than 20 ppm chloride ions (for example less than 10 ppm chloride ions).

End-Use Applications

Asphalt Modification

The declining quality of bitumen drives the need for adding chemical modifiers to enhance the quality of asphalt products. Heavy mineral oils from petroleum refining are the most commonly used modifiers. These mineral oils extend the low temperature limit of the asphalt product by 'plasticizing' the binder, however this also tends to lower the upper temperature limit of the asphalt. The blown and stripped biorenewable oils described herein are not only viable substitutes for mineral oil, but have also been shown to extend the UTI of asphalts to a greater degree than other performance modifiers, therefore providing substantial value to asphalt manufacturers.

UTI of asphalt is determined by a series of standard tests developed by the Strategic Highway Research Program (SHRP) AASHTO specifications. This is a unique property not seen in other asphalt softening additives such as asphalt flux, fuel oils, products based on aromatic or naphthenic distillates, or flush oils. UTI increases for approximately 3% by weight addition of the blown and stripped biorenewable oils, described herein, may be up to 4° C., therefore providing a broader PG modification range such that the lower end temperature can be lower without sacrificing the higher end temperature.

EXAMPLES

The following examples are presented to illustrate the present invention and to assist one of ordinary skill in making and using same. The examples are not intended in any way to otherwise limit the scope of the invention.

Example 1: Blowing the Corn Stillage Oil Using a Catalyst

In this example, a cobalt/calcium hydroxide catalyst is added to corn stillage oil before the blowing step. More specifically, 250 ppm of cobalt and 250 ppm of calcium hydroxide is added to the corn stillage oil. The corn stillage oil is heated to 90-115° C. and subsequently, air is blown through the oil using a sparge ring or dip tube. The reaction is monitored for desired viscosity build.

A control experiment is also carried out that utilizes a similar method but without the use of the cobalt/calcium hydroxide catalyst. The amount of time it takes to achieve a desired viscosity in both the cobalt/calcium experiment and control experiment are compared against each other.

As demonstrated in Table 1, after an 8 and 12 hour period, the viscosity of the blown oil increased at a faster rate in the experiment with the catalyst. In conclusion, using the catalyst improved the blowing reaction time by a factor of around 2.5 times that of the blowing reaction without the catalyst, therefore providing significant time savings to achieve a desired viscosity.

TABLE 1

| Control | | Cobalt/Calcium Catalyst | |
|---|---|---|---|
| Time (hrs) | Viscosity (cSt) | Time (hrs) | Viscosity (cSt) |
| 0 | 32 | 0 | 32 |
| 8 | 37.8 | 8 | 90.8 |
| 12 | 63 | 12 | 165 |
| 16 | 96 | | |

Example 2: Stripping Corn-Stillage Oil Using KOH Catalyst

In this example, about 1000 ppm of KOH catalyst is added to blown corn stillage oil. The blown corn stillage oil is heated to 230-235° C. and stripped using a nitrogen sparge. The reaction is monitored for reduction in acid value. A control experiment is also carried out that utilizes a similar method but without the use of the KOH catalyst. The effect of the KOH catalyst during the stripping step is compared against a control experiment having no catalyst.

As demonstrated in Table 2, the acid value of the stripped oil decreases at a faster rate with the catalyst than without. Even after a 9 hour period, the acid value of the stripped oil without the use of a catalyst did not achieve the low acid value of the stripped oil using KOH achieved after a 5 hour period. Thus, the use of the catalyst decreased the stripping reaction time by a factor of at least 2 times that of the stripping reaction without the catalyst.

TABLE 2

| Control | | KOH Catalyst | |
|---|---|---|---|
| Time (hrs) | Acid Value | Time (hrs) | Acid Value |
| 0 | 20 | 0 | 20 |
| 3 | 9.6 | 3 | 6.6 |
| 4 | 7.7 | 4 | 5.4 |
| 5 | 6.6 | 5 | 3.6 |
| 6 | 6.2 | | |
| 7 | 5.6 | | |
| 8 | 5.3 | | |
| 9 | 4.3 | | |

Example #3: Effect of Free Fatty Acid Content

A set of samples were prepared in which different dosages of Oleic acid (C18:1) was blended into a refined soybean oil. The purpose of the experiment was to demonstrate the adverse effect of the free fatty acid (as represented by the added Oleic acid content in this example) on the flashpoint and aging characteristics of the oil. Table 3 shows the effect of the added oleic acid on the open cup flashpoint:

TABLE 3

| Base Oil Content | Added Oleic Acid Content | Open cup Flashpoint |
|---|---|---|
| 100% SBO | 0% Added Oleic Acid | 314° C. |
| 90% SBO | 10% Added Oleic Acid | 242° C. |
| 75% SBO | 25% Added Oleic Acid | 224° C. |
| 45% SBO | 55% Added Oleic Acid | 208° C. |

Using the oil and oleic acid blends described above, a set of modified asphalt binder comprising the following was made:

97.0% by weight of neat asphalt binder graded as PG64-22 (PG 64.9-24.7)

The modifier blended into the asphalt after the binder had been annealed at 150° C. for 1 hour.

Short term aging was performed using a Rolling Thin Film oven (RTFO) at 163° C. for 85 minutes in accordance to ASTM D2872. The procedure is used to simulate the oxidation and volatilization that occurs in the asphalt terminal when the binder is heated and applied to the aggregate. The RTFO conditioning increases the complex modulus through oxidation and volatilization, as measured using the Dynamic Shear Rheometer parallel plate geometry (25 mm diameter, 1 mm gap) in accordance to ASTM D7175.

The results shown in Table 5 demonstrate a significant increase in the ratio of $|G^*|/\sin \delta$ after aging to that before aging, indicating a higher amount of "age hardening" in the asphalt binder as the free fatty acid content increased. The nearly linear relationship between the increase in the oleic acid content and the increase volatile mass loss also indicates the volatility of the oleic acid at the high temperature and flow rates that the binder is exposed to during RTFO aging. These results indicate the desirability of using low free fatty acid base oils and stripping of the free fatty acid in oils with higher free fatty acid content. Furthermore, stripping to further reduce the free fatty acid content consequently reduces acid value which aids in preventing negative reactions with amine antistrips.

TABLE 4

| Base Oil Content | Added Oleic Acid Content | Unaged \|G*\|/sinδ at at 64° C. (kPa) | RTFO Aged \|G*\|/sinδ at 64° C. (kPa) | Ratio of RTFO/ Unaged | Aging Increase in \|G*\|/sinδ | RTFO Volatile Mass Loss |
|---|---|---|---|---|---|---|
| 100% SBO | 0% Added Oleic Acid | 0.56 | 1.33 | 2.37 | 137.1% | 0.390% |
| 90% SBO | 10% Added Oleic Acid | 0.54 | 1.33 | 2.46 | 145.8% | 0.457% |
| 75% SBO | 25% Added Oleic Acid | 0.53 | 1.35 | 2.55 | 154.8% | 0.545% |
| 45% SBO | 55% Added Oleic Acid | 0.52 | 1.35 | 2.58 | 157.6% | 0.688% |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a meat" includes two or more different meats. As used herein, the term "include" and its grammatical variants are intended to be non-limiting, such that recitation of items in a list is not to the exclusion of other like items that can be substituted or added to the listed items.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

We claim:

1. A method for producing a blown biorenewable oil, the method consisting of:
   (a) heating the oil to at least 90° C. in the presence of a base metal catalyst comprising a transition metal chosen from cobalt, iron, zirconium, lead, and combinations thereof, the base metal catalyst having a concentration of 200 to 1000 ppm; and
   (b) exposing an oxygen containing stream to the heated oil to produce a blown oil having a viscosity of about 40 cSt to about 50 cSt at 40° C. about 2.5 times faster than needed to achieve the same viscosity under the same conditions but without the catalyst;
   wherein the blown oil has a flash point of at least 220° C.

2. The method of claim 1, wherein the oxygen containing stream is air.

3. The method of claim 1, wherein the blown oil has a viscosity of equal to or greater than about 40 cSt to less than 50 cSt at 40° C.

4. The method of claim 1, wherein the oil is heated in (a) to 90° C. to 160° C.

5. A method for producing a blown biorenewable oil, the method comprising:
   (a) heating the oil to at least 90° C. in the presence of a base metal catalyst comprising cobalt, the base metal catalyst having a concentration of 200 to 1000 ppm; and
   (b) exposing an oxygen containing stream to the heated oil to produce a blown oil having a viscosity of about 40 cSt to about 50 cSt at 40° C.;
   wherein the blown oil has a flash point of at least 220° C.

6. The method of claim 5, wherein the blown oil has a viscosity equal to or greater than about 40 cSt to less than 50 cSt at 40° C.

7. The method of claim 5, wherein the oxygen containing stream is air.

8. The method of claim 5, wherein the oil is heated in (a) to 90° C. to 160° C.

9. A method for producing a blown biorenewable oil, the method comprising:
   (a) heating the oil to at least 90° C. in the presence of a base metal catalyst comprising a transition metal chosen from cobalt, iron, zirconium, lead, and combinations thereof, the base metal catalyst having a concentration of 200 to 1000 ppm; and
   (b) exposing an oxygen containing stream to the heated oil to produce a blown oil having a viscosity of about 40 cSt to about 50 cSt at 40° C. about 2.5 times faster than needed to achieve the same viscosity under the same conditions but without the catalyst;
   wherein the blown oil has a flash point of at least 220° C.

10. The method of claim 9, wherein the oxygen containing stream is air.

11. The method of claim 9, wherein the blown oil has a viscosity of equal to or greater than about 40 cSt to less than 50 cSt at 40° C.

12. The method of claim 9, wherein the oil is heated in (a) to 90° C. to 160° C.

13. The method of claim 1, wherein the catalyst comprises cobalt.

14. The method of claim 1, wherein the catalyst is a cobalt/calcium hydroxide catalyst.

15. The method of claim 5, wherein the catalyst is a cobalt/calcium hydroxide catalyst.

16. The method of claim 5, wherein the exposing produces the blown oil having a viscosity about 40 cSt to about 50 cSt at 40° C. about 2.5 times faster than needed to achieve the same viscosity under the same conditions but without the catalyst.

17. The method of claim 9, wherein the catalyst comprises cobalt.

18. The method of claim 9, wherein the catalyst is a cobalt/calcium hydroxide catalyst.

\* \* \* \* \*